United States Patent [19]

Ramer

[11] 4,372,113
[45] Feb. 8, 1983

[54] PIPELINE ENERGY RECAPTURE DEVICE

[76] Inventor: James L. Ramer, Rte. 1, Box 382, Whitestown, Ind. 46075

[21] Appl. No.: 225,170

[22] Filed: Jan. 15, 1981

[51] Int. Cl.³ .............................................. F01D 1/00
[52] U.S. Cl. ..................................... 60/325; 417/169; 415/202; 415/144
[58] Field of Search ................ 60/325, 398, 407, 494; 417/151, 169; 415/202, 151; 290/52; 137/205.5

[56] References Cited

U.S. PATENT DOCUMENTS

| | | | |
|---|---|---|---|
| 532,297 | 1/1895 | Throop | 417/169 |
| 683,762 | 10/1901 | Hitchcock et al. | 417/151 |
| 2,599,678 | 6/1952 | Walker | 137/205.5 |
| 3,140,855 | 7/1964 | Williams et al. | 415/151 |
| 3,185,107 | 5/1965 | Dodge | 417/151 |

Primary Examiner—Martin P. Schwadron
Assistant Examiner—James R. Shay
Attorney, Agent, or Firm—Darrell E. Hollis

[57] ABSTRACT

A constriction in a pipeline forces a portion of the pipeline flow to follow a bypass channel wherein it drives a turbine or Pelton wheel before being returned to an output beyond the constriction. In one embodiment, a pump provides a high velocity flow along a second bypass path which is applied through one or more nozzles to accelerate the fluid in the main bypass path.

11 Claims, 2 Drawing Figures

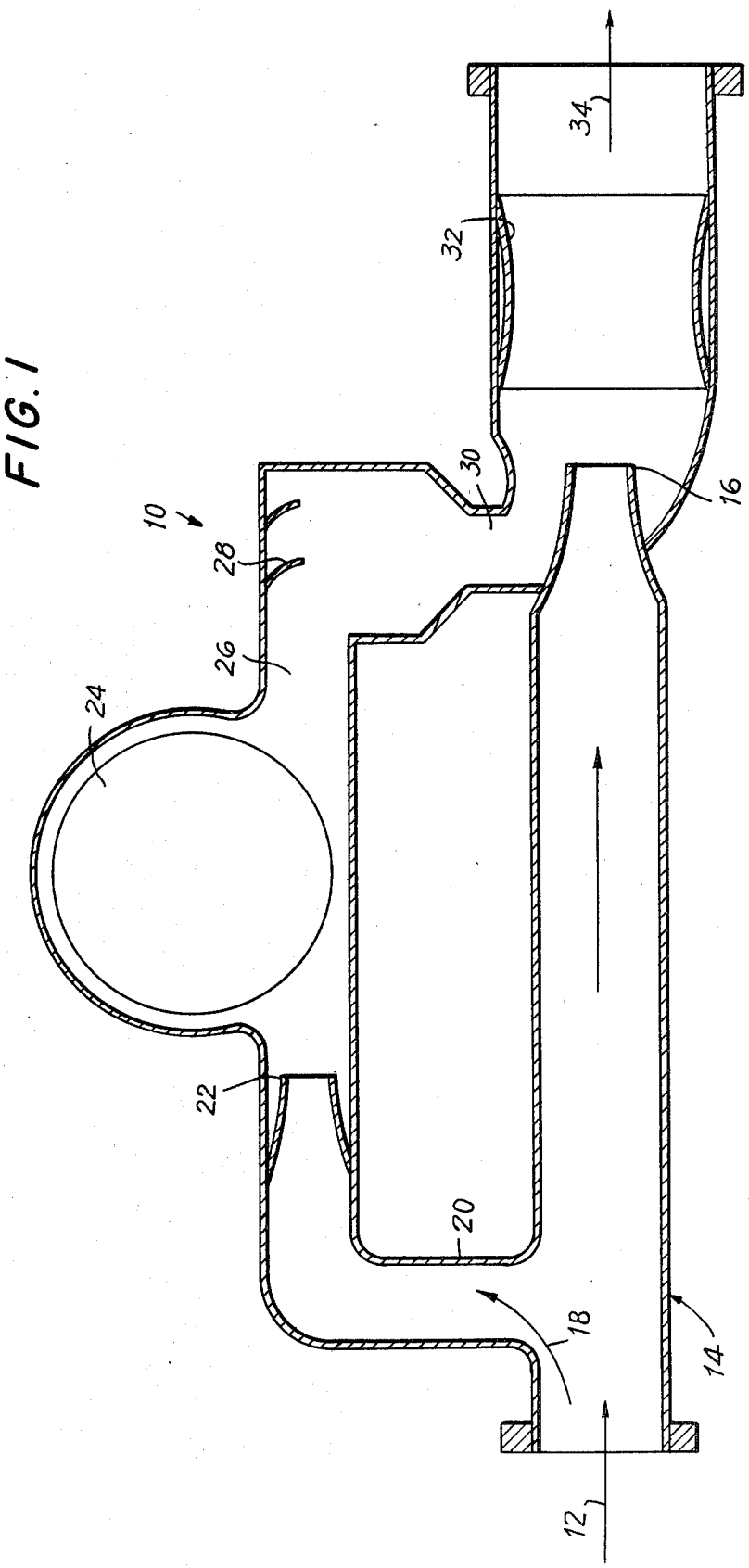

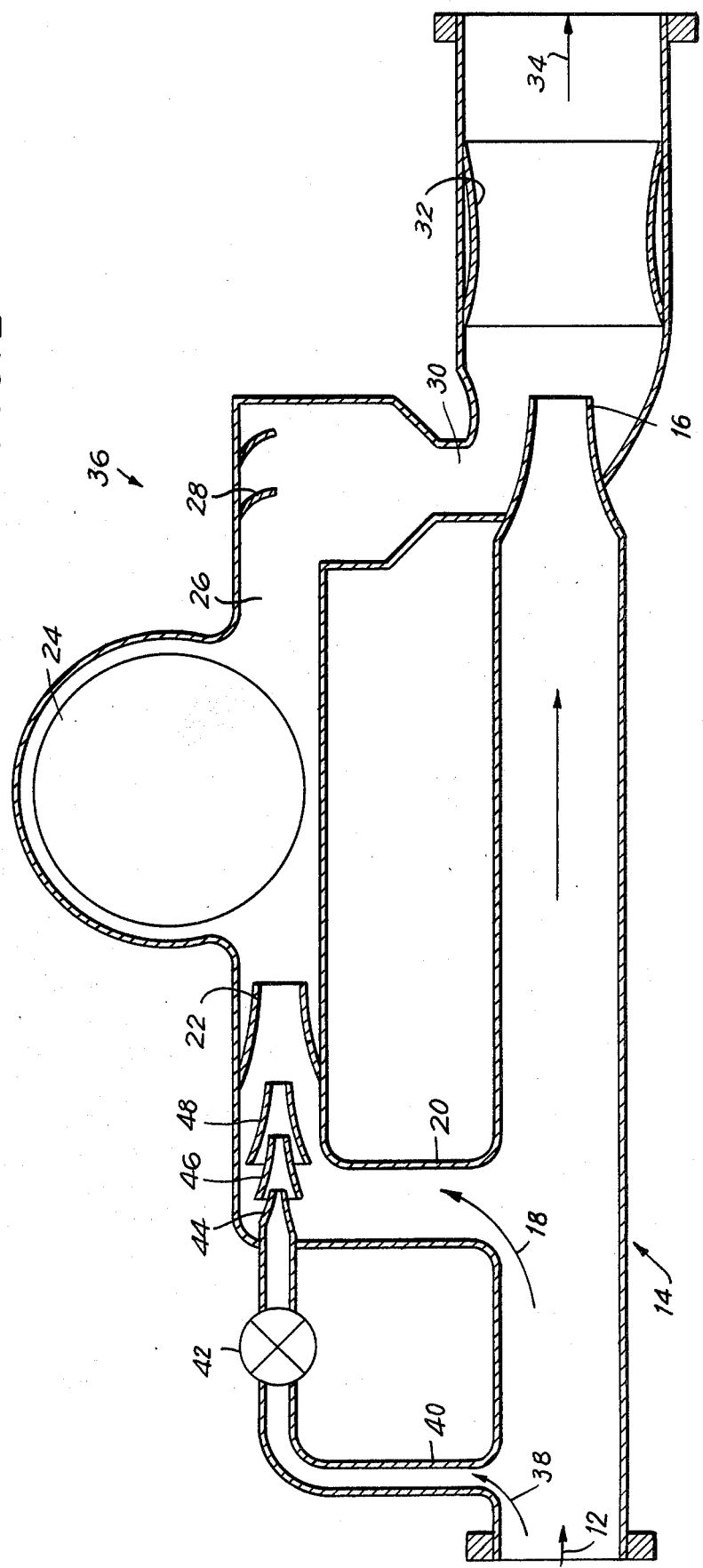

PIPELINE ENERGY RECAPTURE DEVICE

BACKGROUND OF THE INVENTION

The present invention relates to pipeline systems.

In remote locations along a pipeline such as, for example, the Alaska pipeline, a need may exist for a local energy source. In many cases, such an energy source is not available due to the distance and/or inaccessibility of the site.

In a cold climate, a petroleum pipeline may need heater power to maintain the flow of product therethrough. The provision of heater equipment and, in particular, a power source for the heater equipment in remote locations is a difficult task.

OBJECTS AND SUMMARY OF THE INVENTION

It is an object of the present invention to provide a power recapture device for a pipeline.

It is a further object of the invention to provide a device which recaptures a portion of the flow energy in a pipeline to create a local power source.

The flow energy in a pipeline is defined as the pressure times the flow power is created by pumps spaced along the pipeline. The fluid power decreases with distance from each pump due to friction.

A local power source may be provided by constricting the main pipeline flow to force a portion of the fluid through a bypass channel where it drives a mechanical device such as a turbine or a Pelton wheel before being returned to the main flow of the pipeline. A pressure drop is experienced due to the extraction of power in the bypass channel and thus the outflow from the power recapture device is at a lower pressure and velocity than the inflow.

According to an aspect of the invention, there is provided an apparatus for recapturing flow power of a fluid in a pipeline comprising a constriction in the pipeline, a bypass path for at least a portion of the fluid past the constriction, means in the bypass path for producing a mechanical output from fluid in the bypass path, and means for returning substantially all of the fluid from the bypass path to the pipeline at a point downstream of the constriction.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 1 is a cross section of a pipeline power recapture device according to an embodiment of the invention; and FIG. 2 is a cross section of a pipeline power recapture device according to a second embodiment of the invention.

DETAILED DESCRIPTION OF THE PREFERRED EMBODIMENTS

Referring now to FIG. 1, there is shown a pipeline power recapture device 10 according to an embodiment of the present invention. Pipeline fluid flows into power recapture device 10 as shown by an arrow 12 having a pressure and flow rate imparted by a pump (not shown) at a substantial distance upstream.

The incoming fluid enters a main flow body 14 aligned with flow 12. A constriction, such as a nozzle 16, tends to force a portion of the incoming fluid to divert along a bypass path 18 into a bypass pipe 20.

A nozzle 22 directs the bypass flow of fluid onto a rotary device such as a Pelton wheel or a turbine 24 which rotates in response to the high velocity fluid delivered thereto to provide torque to an output shaft (not shown).

An outflow channel 26, which may include turning vanes 28 delivers the outflow from Pelton wheel or turbine 24 to a pipe 30 beyond which it rejoins the output of nozzle 16. A venturi 32 creates a pressure drop at pipe 30 to assist the rejoining of the outflow with the main channel.

The rejoined main and bypass flows leave power recapture device 10 in the direction shown by an arrow 34 at lower pressure than the pressure existing at the inflow 12. The difference in pressure is accounted for by the power recaptured from the pipeline flow by Pelton wheel or turbine 24 as well as by additional friction losses due to insertion of the device in the pipeline.

The torque provided by Pelton wheel or turbine 24 may be employed to drive an electrical generator or pump or provide power to any other suitable device. For best results, power recapture device 10 should be installed at a point in a pipeline where the highest local pressure may be experienced. Thus, a suitable location is a low point in the pipeline where gravity provides the greatest local pressure.

Referring now to FIG. 2, there is shown a pipeline power recapture device 36 according to a second embodiment of the invention wherein like numerals identify the same elements as in FIG. 1.

An additional bypass path 38 enters a second bypass pipe 40 having a diameter substantially smaller than bypass pipe 20. A high pressure pump 42 pumps a high pressure flow of fluid from bypass pipe 40 to a nozzle 44. The high velocity flow from nozzle 44 passes through first and second nozzles 46 and 48 wherein the relatively low velocity fluid in pipe 20 is substantially accelerated to provide a relatively high velocity and high volume flow to nozzle 22 which further accelerates the flow of fluid. Thus, a relatively high velocity, high volume flow of fluid emerges from nozzle 22 and impacts on Pelton wheel or turbine 24 to provide a relatively high torque output therefrom.

Having described specific embodiments of the invention with respect to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for recapturing flow power of a fluid in a pipeline comprising:
    (a) a constriction in said pipeline;
    (b) a first bypass path for directing a first portion of said fluid past said constriction;
    (c) a second bypass path for directing a second portion of said fluid past said constriction;
    (d) means, disposed in said second bypass path, for accelerating a portion of the fluid in said first bypass path;
    (e) means for producing a mechanical output from the fluid in said first and second bypass paths, (f) means for returning substantially all said fluid from said first and second bypass paths to said pipeline at a point downstream of said constriction.

2. An apparatus according to claim 1 wherein said means for producing a mechanical output includes a Pelton wheel.

3. The apparatus of claim 1 wherein said accelerating means includes
   (a) means for producing a high pressure stream of said fluid in said second bypass path;
   (b) means for converting said high pressure stream to a high velocity flow; and
   (c) a first nozzle, open to said fluid in said first bypass path, having said high velocity flow directed therethrough whereby a portion of said fluid in said first bypass path is accelerated through said first nozzle.

4. The apparatus of claim 3 further including means, receiving the flow from said first nozzle, for directing the flow to said mechanical output producing means.

5. The apparatus of claim 3 wherein said high pressure producing means includes a pump.

6. The apparatus of claim 3 wherein said high pressure converting means includes at least one nozzle.

7. The apparatus of claim 6 wherein said at least one nozzle includes a second and a third nozzle.

8. The apparatus of claim 7 wherein said first and third nozzle are open to the fluid in said first and second bypass paths and said second nozzle is open to the fluid in said second bypass path.

9. The apparatus of claim 7 wherein said third nozzle is open to the fluid in said first bypass path and disposed between said first and second nozzles whereby a greater portion of the fluid is said first bypass path is accelerated.

10. The apparatus of claim 4 wherein said flow directing means includes a fourth nozzle.

11. The apparatus of claim 1 wherein said returning means includes a venturi disposed in said pipeline.

* * * * *